(12) United States Patent
Das et al.

(10) Patent No.: US 9,218,367 B2
(45) Date of Patent: Dec. 22, 2015

(54) METHOD AND INTERFACE FOR INDEXING RELATED MEDIA FROM MULTIPLE SOURCES

(75) Inventors: Madirakshi Das, Penfield, NY (US); Cathleen D. Cerosaletti, Rochester, NY (US); Alexander C. Loui, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 903 days.

(21) Appl. No.: 13/463,183

(22) Filed: May 3, 2012

(65) Prior Publication Data

US 2012/0260175 A1    Oct. 11, 2012

Related U.S. Application Data

(62) Division of application No. 12/206,319, filed on Sep. 8, 2008, now abandoned.

(51) Int. Cl.
*G06F 17/30* (2006.01)

(52) U.S. Cl.
CPC .... *G06F 17/30265* (2013.01); *G06F 17/30551* (2013.01)

(58) Field of Classification Search
CPC .................................................. G06F 3/04847
USPC ......................................... 715/721, 719, 786
See application file for complete search history.

(56) References Cited

U.S. PATENT DOCUMENTS

| | | | |
|---|---|---|---|
| 6,204,886 B1 * | 3/2001 | Yoshimura | H04N 5/44 348/564 |
| 6,307,550 B1 * | 10/2001 | Chen | G06F 17/30811 345/418 |
| 6,606,411 B1 | 8/2003 | Loui et al. | |
| 6,701,014 B1 | 3/2004 | Syeda-Mahmood | |
| 6,901,207 B1 * | 5/2005 | Watkins | H04N 5/85 348/E7.061 |
| 6,910,191 B2 * | 6/2005 | Segerberg | H04N 5/44543 348/E5.105 |
| 6,950,989 B2 | 9/2005 | Rosenzweig | |
| 6,978,047 B2 | 12/2005 | Montgomery | |
| 7,028,264 B2 | 4/2006 | Santoro et al. | |
| 7,102,644 B2 | 9/2006 | Hoddie et al. | |
| 7,158,689 B2 | 1/2007 | Valleriano et al. | |
| 7,423,660 B2 * | 9/2008 | Ouchi | G06F 3/04855 345/634 |
| 7,650,626 B2 * | 1/2010 | Suh | H04H 20/28 725/139 |
| 8,276,098 B2 * | 9/2012 | Fagans | G06F 3/04817 715/810 |
| 2001/0005442 A1 * | 6/2001 | Ueda | H04L 12/40117 386/225 |
| 2002/0033899 A1 * | 3/2002 | Oguma | H04N 5/45 348/565 |

(Continued)

FOREIGN PATENT DOCUMENTS

EP    1 927 928 A2    6/2008

OTHER PUBLICATIONS

Final Rejection on U.S. Appl. No. 12/206,319, mailed Mar. 29, 2012.

(Continued)

*Primary Examiner* — Daeho Song (57) ABSTRACT

The invention relates generally to the field of digital image processing, and in particular to a method for associating and viewing related video and still images. In particular, the present invention is directed to methods for associating and/or viewing digital content records comprising ordering a first set of digital content records and the second set of digital content records based upon information associated with each of the digital content records.

19 Claims, 7 Drawing Sheets

(56) References Cited

U.S. PATENT DOCUMENTS

| | | | |
|---|---|---|---|
| 2002/0118952 A1* | 8/2002 | Nakajima | H04N 5/9205 386/239 |
| 2003/0231198 A1 | 12/2003 | Janevski | |
| 2004/0028382 A1* | 2/2004 | Choi | G11B 27/034 386/297 |
| 2004/0064207 A1* | 4/2004 | Zacks | G06F 17/30787 700/91 |
| 2005/0091597 A1* | 4/2005 | Ackley | G11B 19/025 715/716 |
| 2005/0108643 A1* | 5/2005 | Schybergson | G06F 17/30064 715/713 |
| 2005/0257166 A1* | 11/2005 | Tu | G06F 3/0485 715/787 |
| 2006/0090141 A1 | 4/2006 | Loui | |
| 2006/0123357 A1* | 6/2006 | Okamura | G06F 3/0482 715/786 |
| 2006/0200475 A1 | 9/2006 | Das | |
| 2007/0071323 A1* | 3/2007 | Kontsevich | G06K 9/4604 382/190 |
| 2007/0192729 A1* | 8/2007 | Downs | G06F 3/04855 715/786 |
| 2007/0200925 A1* | 8/2007 | Kim | G06T 11/00 348/14.08 |
| 2008/0044155 A1 | 2/2008 | Kuspa | |
| 2008/0112621 A1 | 5/2008 | Gallagher et al. | |
| 2008/0298643 A1 | 12/2008 | Lawther et al. | |
| 2008/0307307 A1* | 12/2008 | Ciudad | G06T 13/80 715/719 |
| 2008/0309647 A1 | 12/2008 | Blose | |
| 2009/0161962 A1 | 6/2009 | Gallagher et al. | |
| 2009/0172543 A1* | 7/2009 | Cronin | G06F 3/04847 715/721 |
| 2009/0265647 A1 | 10/2009 | Martin et al. | |
| 2010/0281370 A1* | 11/2010 | Rohaly | A61C 9/0053 715/719 |

OTHER PUBLICATIONS

International Preliminary Report on Patentability for PCT/US2009/004990, issued Mar. 8, 2011.

International Search Report and Written Opinion for PCT?US2009/004990, mailed Feb. 5, 2010.

Non-Final Office Action on U.S. Appl. No. 12/206,319, mailed Aug. 2, 2011.

Non-Final Office Action on U.S. Appl. No. 12/206,319, mailed Dec. 12, 2011.

Graham Adrian et al.: "Time as Essence for Photo Browsing Through Personal Digital Libraries", JCDL 2002. Proceedings of the Second ACM/IEEE-CS Joint Conference on Digital Libraries, Portland, OR, Jul. 14-18, 2002; [Proceedings ACM/IEEE-CS Joint Conference on Digital Libraries], New York, NY, ACM, US, vol. Conf. 2, Jul. 14, 2002, pp. 326-335, XP-002383768, ISBN: 978-1-58113-513-8, Section 2; Figures 1a, 1b, Section 3.

Calic Janko et al, "Efficient Key-Frame Extraction and Video Analysis", IEEE International Conference on Information Technology: Coding and Computing 2002.

Lowe David G., "Distinctive Image Features From Scale-Invariant Keypoints", International Journal of Computer Vision, vol. 60, No. 2, 2004.

\* cited by examiner

METHOD AND INTERFACE FOR INDEXING RELATED MEDIA FROM MULTIPLE SOURCES

CROSS REFERENCE TO RELATED APPLICATION

This application is a divisional of commonly-assigned U.S. Ser. No. 12/206,319 filed Sep. 8, 2008 now abandoned, entitled "Method and Interface for Indexing Related Media From Multiple Sources" by Madirakshi Das et al, the disclosure of which is incorporated herein.

FIELD OF THE INVENTION

The invention relates generally to the field of digital image processing, and in particular to a method for associating and viewing related video and still images.

BACKGROUND OF THE INVENTION

The proliferation of digital image and video capture devices has led to multiple modalities of capture being present at any picture-taking occasion. For example, it is possible to have both videos and still images since most digital cameras now support capture of video clips; and digital camcorders can capture still images. In an important family event or a public event, such as weddings and sports matches, there are usually multiple still and video capture devices capturing the scene simultaneously. This scenario results in videos and stills that overlap in time. For instance, multiple stills may be captured during the duration of a video clip and multiple video sequences may overlap to various degrees. The current state of the art in consumer image management software, such as Google Picasa, Adobe Photo Album and Kodak EasyShare, display still images and videos in chronological order with no ability to indicate overlapping captures. In some cases, the date/time of file creation (not capture date/time) is used for video, which effectively removes video clips from the natural timeline and places them at one end of a batch of media transferred from capture device to storage device. In the best cases, videos are inserted at the point in the timeline indicated by the start of capture. Still images or video captured during the duration of a longer video clip appear after its thumbnail representation, with no indication of possible overlap; where overlaps could be in time or another relevant concept such as location or event.

This mode of display makes it difficult to pick the best representation of a given moment; choose between different modalities or create composites of different modalities. An alternative is to provide browsing mechanisms that explicitly show overlaps between captures of one or more modalities and also allows the user to switch between them on a UI display.

In U.S. Pat. No. 6,950,989, Rosenzweig et al describe a timeline-based browsing view for image collections. The images in the collection can be viewed at different time granularity (year-by-year, month-by-month etc), and also along other metadata such as location taken and people in picture. However, it is assumed that all media in the collection can be placed in order on the timeline, and overlaps in time between media are not handled.

A few patents discuss some aspects of media overlaps in time or media captured at the same event, but in very limited circumstances, and in contexts other than browsing a consumer image collection. In U.S. Pat. No. 6,701,014, Syeda-Mahmood describes a way to associate slides (say in Microsoft PowerPoint) to slides that are being shown on a screen in a video of the presentation. In U.S. Pat. No. 7,102,644, Hoddie et al describe a way to embed movies within a movie, in cases where there is overlap in content between them. The intention is to allow video editors to edit all the related clips at the same time, so that any changes made in one stream can be reflected in the other related ones. In U.S. Pat. No. 7,028,264, Santoro et al describe an interface that shows multiple sources on the same screen, but these sources are not related to each other and are not linked in any way. For example, the sources could be different television channels covering the news, sports, weather and stocks. In U.S. Pat. No. 6,978,047, Montgomery describes storing multiple views of the same event for surveillance applications, but in this case, the video cameras are synchronized. This system does not provide means for relating asynchronous captures that occur in the consumer event captures, and there is no browsing interface provided. In U.S. Pat. No. 7,158,689, Valleriano et al handle asynchronously captured images of an event, but the event type is a special case of a timed event such as a race, and contestants are tracked at various fixed stations. These methods are specific to the applications being described, and provides no framework for handling the generalized problem of browsing multiple sources of media captured asynchronously at the same event.

SUMMARY OF THE INVENTION

In accordance with one aspect of the present invention there is provided a method for organizing digital content records including: receiving a first set of digital content records captured from a first digital-content capture device; receiving a second set of digital content records captured from a second digital-content capture device; ordering the first set of digital content records and the second set of digital content records along a common capture timeline; and storing results of the ordering step in a processor-accessible memory system.

In accordance with another aspect of the present invention there is provided a method for organizing digital content records including:
receiving a first set of digital content records captured from a first digital-content capture device, each digital content record in the first set having associated therewith time/date of capture information defining when the associated digital content record was captured, wherein the capture information associated with a particular digital content record from the first set defines that its associated digital content record was captured over a contiguous span of time; receiving a second set of digital content records captured from a second digital-content capture device, each digital content record in the second set having associated therewith time/date of capture information defining when the associated digital content record was captured; ordering the first set of digital content records and the second set of digital content records along a common capture timeline based at least upon the time/date of capture information, or a derivative thereof associated with each of the digital content records in the first and second sets, wherein the ordering step causes the particular digital content record and at least one other digital content record to be associated with a same time/date within the span of time in the capture timeline; and storing results of the ordering step in a processor-accessible memory system.

In accordance with another aspect of the present invention there is provided a method for displaying digital content records including: receiving a set of digital content records organized along a timeline, each digital content record being associated with a point on or segment of the timeline based at least upon its time/date of capture and, optionally, span of capture, at least two digital content records being associated with at least a same point on the timeline;

identifying a current point on the timeline; displaying a digital content record of the set of digital content records as a focus record, the focus record associated with the current point on the timeline and being displayed prominently on a display; displaying first other digital content records of the set of digital content records on the display, the first other digital content records having time/dates of capture or spans of capture temporally adjacent to the current point on the timeline and being displayed less prominently than the focus record on the display; and displaying second other digital content records of the set of digital content records on the display, the second other digital content records having a time/date of capture or a span of capture equal to or including the current point on the timeline.

In accordance with yet another aspect of the present invention there is provided a method for presenting digital content records including: instructing presentation of a first digital content record on an output device, wherein the first digital content record is a video or audio digital content record; identifying a second digital content record having an association with the first digital content record, wherein the association is based at least upon adjacency in time, a common object represented therein, a common event during which the first and second digital content records were captured, or a common location at which the digital content records were captured; and instructing presentation of the second digital content record on the output device while the first digital content record is being presented.

In accordance with a further aspect of the present invention there is provided a system for indexing media from different sources including:

a means for receiving a first set of digital content records captured from a first digital-content capture device; a means for receiving a second set of digital content records captured from a second digital-content capture device; a means for ordering the first set of digital content records and the second set of digital content records along a common capture timeline; and a means for storing results of the ordering step in a processor-accessible memory system.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
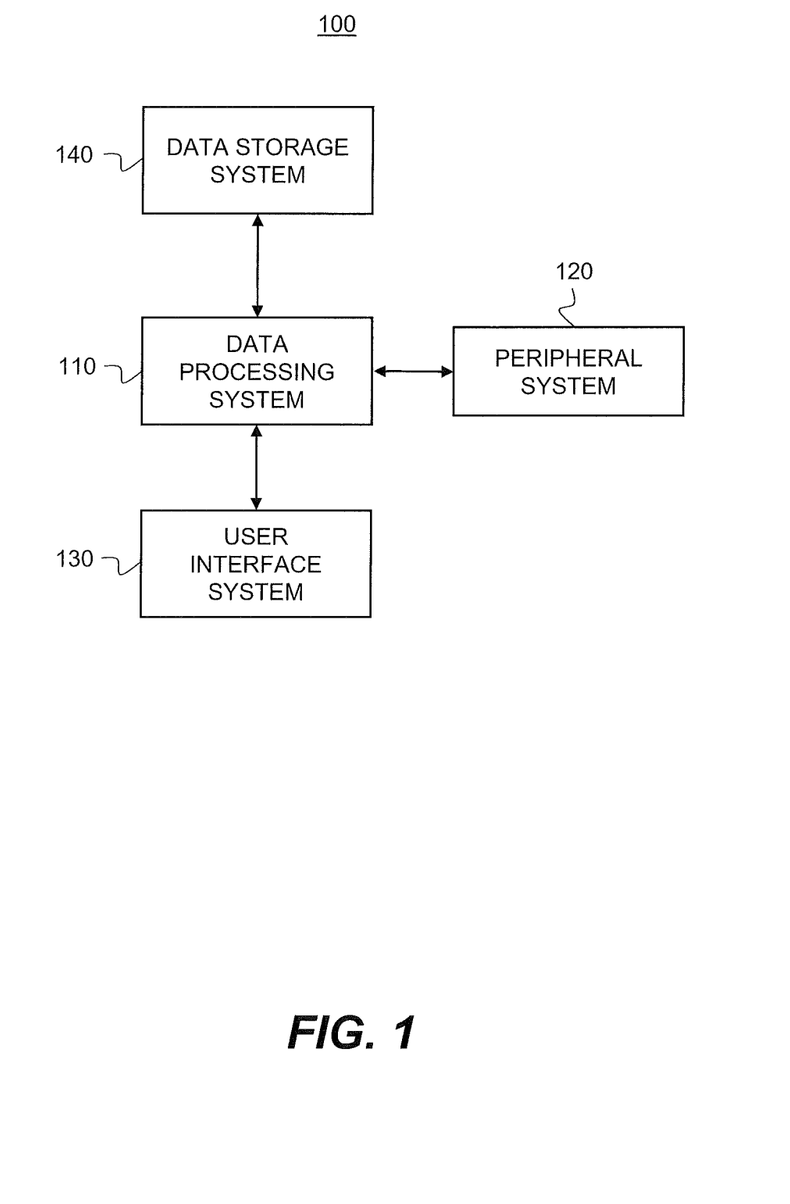
FIG. 1 illustrates a system for automatically indexing media from different sources, according to an embodiment of the present invention.

FIG. 1 illustrates a system 100 for automatically indexing media from different sources, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

The data processing system 110 includes one or more data processing devices that implement the processes of the various embodiments of the present invention, including the example processes of FIGS. 2, 3, 4, 5, 6, 7, and 8 described herein. The phrases "data processing device" or "data processor" are intended to include any data processing device, such as a central processing unit ("CPU"), a desktop computer, a laptop computer, a mainframe computer, a personal digital assistant, a Blackbeny™, a digital camera, cellular phone, or any other device for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention, including the example processes of FIGS. 2, 3, 4, 5, 6, 7, and 8 described herein. The processor-accessible memory system 140 may be a distributed processor-accessible memory system including multiple processor-accessible memories communicatively connected to the data processing system 110 via a plurality of computers and/or devices. On the other hand, the processor-accessible memory system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital video cameras, cellular phones, regular digital cameras, or other data processors. The data processing system 110, upon receipt of digital content records from a device in the peripheral system 120, may store such digital content records in the processor-accessible memory system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the processor-accessible memory system 140 even though the user interface system 130 and the processor-accessible memory system 140 are shown separately in FIG. 1.

Figure 2:
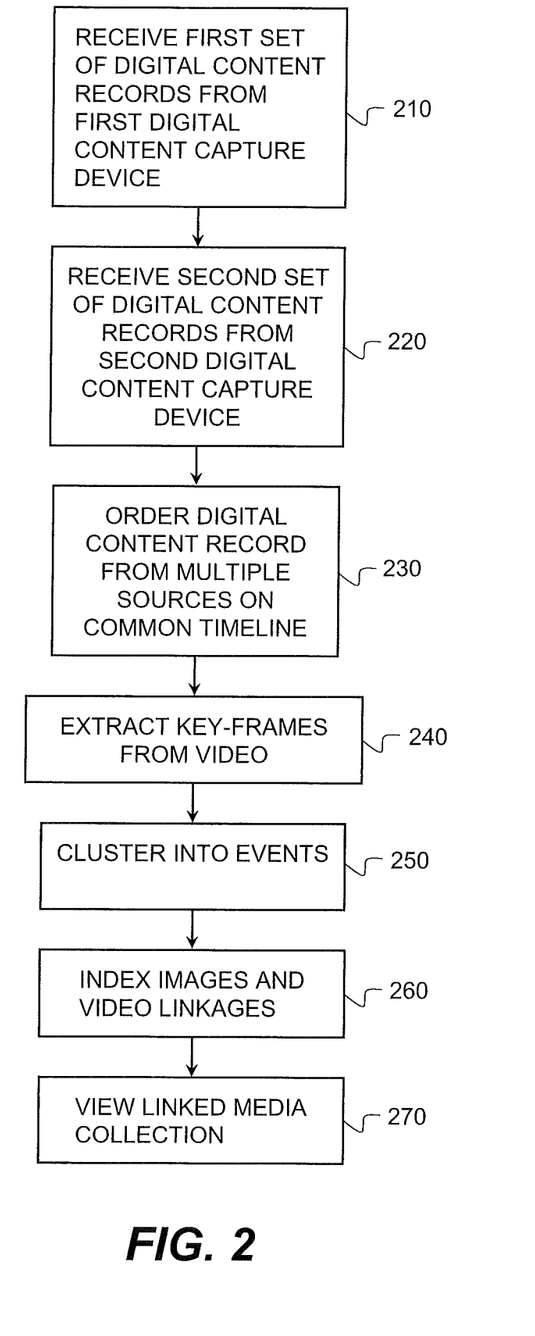
FIG. 2 illustrates a method for indexing multiple media from different sources, according to an embodiment of the present invention.

The main steps in automatically indexing media from different sources are shown in FIG. 2. The phrase, "digital content record", as used herein, refers to any digital content record, such as a digital still image, a digital audio file, a digital video file, etc. Note that the phrase, "digital content record" and "media" are used interchangeably in this invention. If text input is enabled in the device (such as a text messaging in a cell-phone), these can also be included in the broad category of captured "digital content record." In this scenario, multiple users can upload their digital content record to a common location. The digital content record can be captured with different cameras as well as different picture takers. The collection may not be owned by any one user.

Referring to FIG. 2, the first step 210 is the receiving of a first set of digital content records captured from a first digital-content capture device Each of said digital the content records having associated therewith time/date of capture information defining when the associated digital content record was captured and wherein the capture information associated with a particular digital content record from the first set defines that its associated digital content record was captured over a contiguous span of time. Second step 220 is the receiving a second set of digital content records captured from a second digital-content capture device, each digital content record in the second set also having associated therewith time/date of capture information.

Figure 3:
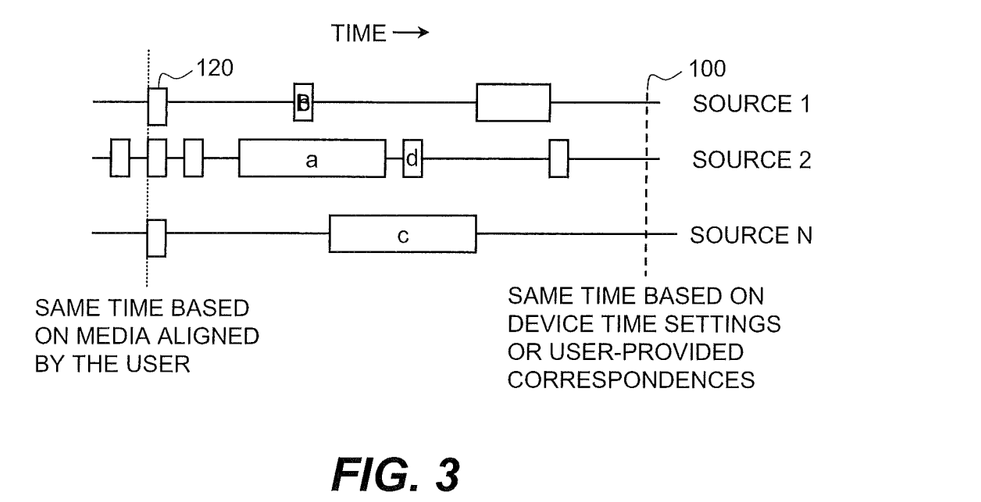
FIG. 3 illustrates media from different sources is aligned according to the time of capture, according to an embodiment of the present invention.
Figure 4:
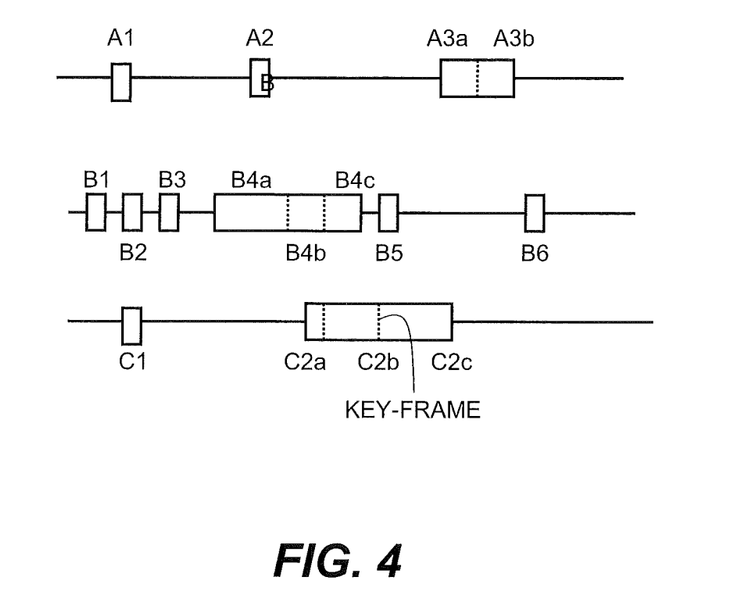
FIG. 4 illustrates an example of the input image sequence from different sources, according to an embodiment of the present invention.

Next, step 230 is to place the digital content record on a common capture timeline. Media from digital sources contain the time of capture as part of the metadata associated with the digital content record. The digital content records from different sources are aligned according to the time of capture as shown in FIG. 3. The time setting on each device capturing a scene may not be synchronized, leading to different time stamps on digital content record captured at the same instant. In this case, the user can modify the time/date of capture on each device at any given instant, allowing the system to slide the timeline for each device till they are aligned 100 based on the modified time/date of capture information. Alternatively, the user can manually align a single digital content record capture from each capture stream, and the system can align the timelines based on the time differences between the aligned digital content record 120. The user may also provide time correspondences between different sources even when they have correct time settings if they wish to combine the digital content record for some special purpose. For example, they may intend to combine correctly time-stamped digital content record taken in different time zones to show events that were occurring concurrently in different locations. User input may also be used to keep digital content record from overlapping time-frames separate. For example, the user may choose to keep the timelines separate when the media streams are from unrelated events. In this case, all future steps are applied to the separated streams individually.

Alignment of the digital content may also be based on user-provided annotations at user-defined points along the common timeline. the user-provided annotations include text data, audio data, video data, or graphical data such as text data includes text messages, web links, or web logs.

Automated time alignment of the capture devices based on image similarity is another alternative. A method for aligning media streams when the capture date-time information is unavailable is described in commonly assigned US Patent Application 20060200475 entitled "Additive clustering of images lacking individual date/time information."

The digital content record is then ordered chronologically based on their relative position on the common time-line, wherein the ordering step causes the particular digital content record and at least one other digital content record to be associated with a same time/date within the span of time in the capture timeline. For video clips, the start time of the video is used for the ordering step. Note that the end time of a video clip can also be computed, if not available in the metadata inserted by the capturing device, by computing the total number of frames divided by the frame-rate of the capture device, and adding this to the known start time. The end time is needed to determine the time difference from the next digital content record, as described later.

Referring to FIG. 2, key-frames are extracted from video clips 240. There are many published methods for extracting key-frames from video. As an example, Calic and Izquierdo propose a real-time method for scene change detection and key-frame extraction by analyzing statistics of the macro-block features extracted from the MPEG compressed stream in "Efficient Key-Frame Extraction and Video Analysis" published in IEEE International Conference on Information Technology Coding and Computing, 2002. The time of capture of each key-frame is computed by dividing the frame number by the frame-rate of the capture device, and adding this to the known start time.

Referring to FIG. 2, the digital content record on the merged timeline is clustered into events 250. A method for automatically grouping images into events and sub-events is described in U.S. Pat. No. 6,606,411 B1, to Loui and Pavie (which is hereby incorporated herein by reference). Date and time of capture provided by digital camera metadata and block-level color histogram similarity are used to determine events and sub-events. First, time intervals between adjacent digital content record (time differences) are computed. A histogram of the time differences vs. number of digital content record is then prepared. If desired, the histogram can then be then mapped to a scaled histogram using a time difference scaling function. This mapping substantially maintains small time differences and compresses large time differences. A two-means clustering is then performed on the mapped time-difference histogram for separating the mapped histogram into two clusters based on the time difference. Normally, events are separated by large time differences. The cluster having larger time differences is considered to represent time differences that correspond to the boundaries between events.

In the scenario of this invention, the "image" set that is provided to the event clustering algorithm (described in U.S. Pat. No. 6,606,411) includes still images as well as key-frames from video clips (along with their computed time of capture) from all sources combined. For example, referring to FIG. 4, the input set of images would be B1-A1-B2-C1-B3-B4a-A2-B4b-C2a-B4c-B5-C2b-C2c-A3a-A3b-B6; where the first letter refers to the source, the number refers to the order within that source and the last letter, if present, indicates the key-frame's order within the video clip. The algorithm produces event groups based on time differences, and sub-events based on image similarity. Since block-level color histogram similarity is used to determine sub-events, each sub-event extracted using U.S. Pat. No. 6,606,411 has consistent color distribution, and therefore, these pictures are likely to be of the same scene. It is to be noted that digital content record from different sources may be part of the same event, since there is no distinction made based on the source of the digital content record.

Referring to FIG. 2, 260 links are created between digital content record segments contained within a single event as follows: (a) Still images and other one-time digital inputs such as text/voice annotation are linked to other still and video key-frames from all sources that are within a threshold (typically, a few minutes) of their capture time. (b) Video clips and other continuous captures such as sound recording are linked to still images and key-frames from all sources that fall within their duration of capture.

Figure 5:
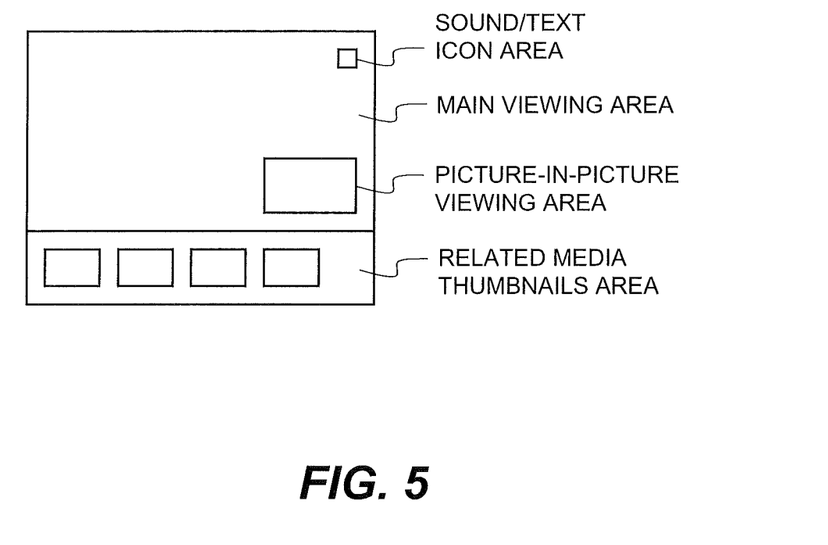
FIG. 5 illustrates an example of the viewing window, according to an embodiment of the present invention.

Referring to FIG. 2, step 270 involves the ability to view the linked content. FIG. 5 provides an example of the viewing window. The digital content record (still or video) being currently viewed appears in the main viewing area. If there are any sound/text snippets that link to the content being currently viewed, an icon appears as shown, that the user can click to access. All digital content record linked by the digital content record being viewed appear as thumbnails in the lower panel. The digital content record closest in time to the digital content record being viewed appears in the picture-in-picture area. Clicking on this area swaps the content in the main area with this content. Clicking on a thumbnail moves the thumbnail to the main viewing area.

In another embodiment, the links between digital content record are created based on semantic object matches. For example, links are generated between images containing a particular person and video segments that contain the same person. This allows a user to view still images taken of people that appear in videos, or view a video clip of what a person is doing or saying at the instant a particular still image was taken. In commonly assigned patent application Ser. No. 11/559,544, filed Nov. 14, 2006, entitled "User Interface for Face Recognition", Gallagher et al describe a method for clustering faces into groups of similar faces that are likely to represent distinct individuals using available face recognition technology. Since all the digital content record in our application is from the same event, further refinement of people recognition is possible as described in commonly assigned patent application Ser. No. 11/755,343, filed May 30, 2007 by Lawther et al, entitled "Composite person model from image collections". In this application, clothing and other contextual information that are likely to remain the same during the event are used to improve recognition of individuals.

Another example of links based on semantic objects is to link images and video frames where similar objects are present in the background that indicates that the two captures were taken against the same backdrop. This allows the user to view still images captured of the same scene that is seen in a video clip, or view the same scene captured from different viewpoints. In commonly assigned application Ser. No. 11/960,800, filed Dec. 20, 2007, entitled "Grouping images by location", a method for determining groups of images captured at the same location is described. This method uses SIFT features, described by Lowe in International Journal of Computer Vision, Vol 60, No 2., 2004 to match image backgrounds after filtering the features to retain only the features that correspond to potentially unique objects in the image.

Figure 6:
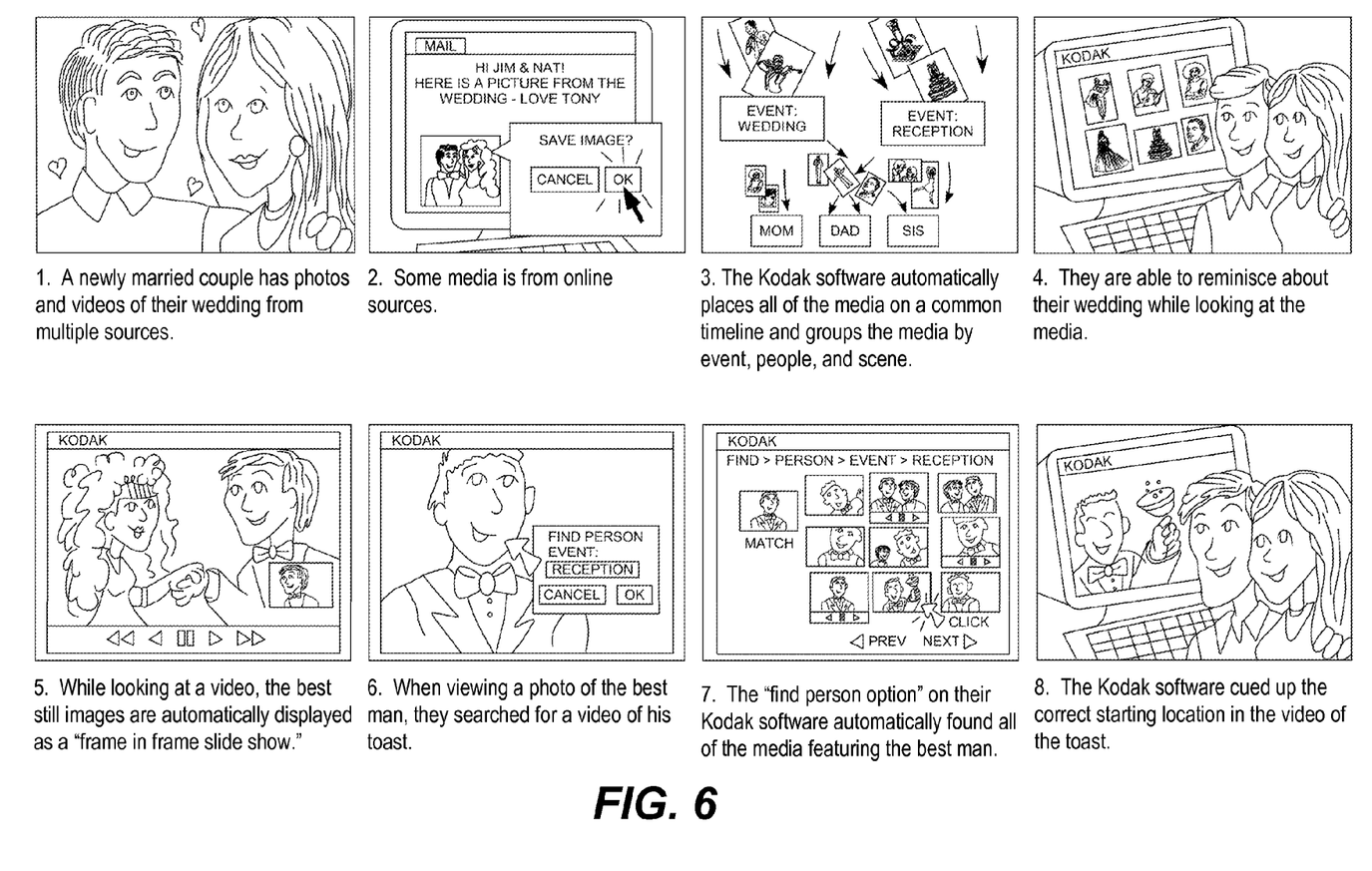
FIG. 6 illustrates a possible use scenario that further illustrates the concept of the present invention.

FIG. 6 shows a possible use scenario that further illustrates the concept. In window 3, the software automatically places all of the digital content record on a common timeline and groups the pictures by event, people, and scene. The user's ability to move from one type of digital content record to another and choose the best capture of a particular moment is demonstrated in windows 5 and 6. FIG. 6 also shows an instance where links to other digital content record containing the same person captured during a neighboring time interval is useful.

Figure 7:
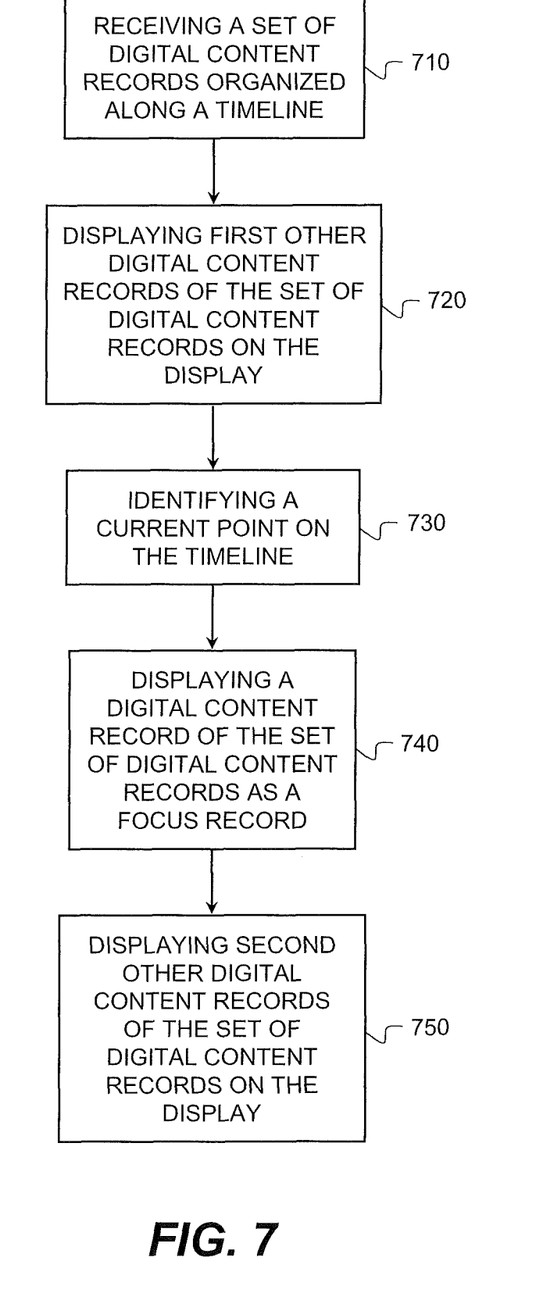
FIG. 7 illustrates a method for displaying digital content records, according to an embodiment of the present invention.

The present invention also embodies a method for displaying digital content records. Related media may be displayed based on its current location along a timeline. Referring now to FIG. 7, the method for displaying digital content records begins with step 710 receiving a set of digital content records organized along a timeline, each digital content record being associated with a point on or segment of the timeline based at least upon its time/date of capture and, optionally, span of capture, at least two digital content records being associated with at least a same point on the timeline. Step 720 requires identifying a current point on the timeline. A digital content record of the set of digital content records is displayed as a focus record 730, the focus record being associated with the current point on the timeline and being displayed prominently on a display. The first other digital content records of the set of digital content records on the display are then displayed, preferably as a scroll-bar of content at the bottom of the display, the first other digital content records having time/dates of capture or spans of capture temporally adjacent to the current point on the timeline and being displayed less prominently than the focus record on the display 740. The second other digital content records, or the overlapping media, of the set of digital content records on the display is then displayed, the second other digital content records having a time/date of capture or a span of capture equal to or including the current point on the timeline 750. The overlapping media may be displayed in a region on the display that overlaps with the focus record, creating a "picture-in-picture" where the focus record occupies a prominent part of the display region and the overlapping media occupies a smaller region. This display may include the ability of the user to swap the focus record with the overlapping media by selecting the overlapping media being displayed. The scroll bar and overlapping media may occupy different parts of the display. Thus, the first other digital content records may be displayed in a first region of the display that does not overlap with a second region of the display in which the second other digital content records are displayed. The related digital content may also be limited to non-overlapping location or region on the display whereby the focus record is displayed in a main region of the display that does not overlap with the first region or the second region.

The display may also include a user-selectable visual representation, or icon, configured to cause, when selected, display of text or audio comments associated with the focus record and the current point on the timeline.

Figure 8:
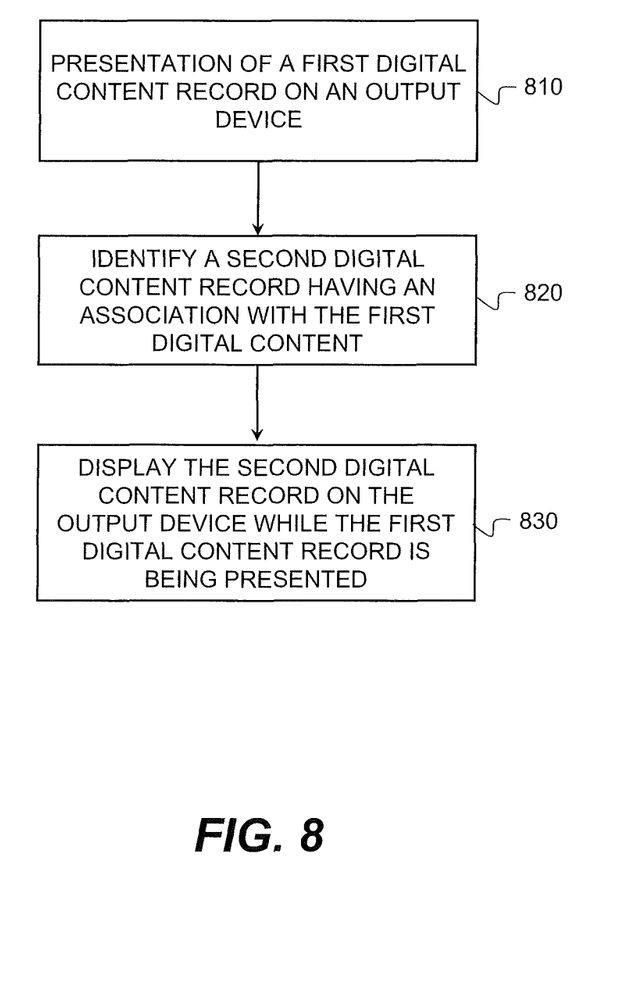
FIG. 8 illustrates a method for presenting digital content records, according to an embodiment of the present invention.

Referring now to FIG. 8, the present invention further embodies a method for presenting digital content records. The initial step is the presentation of a first digital content record on an output device 810, wherein the first digital content record is a video or audio digital content record. Then, a second digital content record having an association with the first digital content record is then identified 820, wherein the association is based at least upon adjacency in time, a common object represented therein, a common event during which the first and second digital content records were captured, or a common location at which the digital content records were captured. Finally, the second digital content record is presented on the output device while the first digital content record is being presented 830.

It is to be understood that the exemplary embodiment(s) is/are merely illustrative of the present invention and that many variations of the above-described embodiment(s) can be devised by one skilled in the art without departing from the scope of the invention. It is therefore intended that all such variations be included within the scope of the following claims and their equivalents.

What is claimed is:

1. A method implemented at least in part by a data processing system, the method comprising:
   receiving a first set of digital content records from a first source;
   receiving a second set of digital content records from a second source;
   organizing the first set of digital content records and the second set of digital content records along a timeline, wherein each digital content record in the first set of digital content records and the second set of digital content records is associated with a point on or segment of the timeline based at least upon time/date of capture and span of capture, wherein at least two digital content records in the first set of digital content records and the second set of digital content records are associated with at least a same point on the timeline;
   identifying a current point on the timeline;
   displaying a digital content record of the first set of digital content records as a focus record, wherein the focus record is associated with the current point on the timeline and is displayed prominently in a prominent section on a display;
   displaying digital content records of the first set of digital content records other than the focus record on the display having time/dates of capture and spans of capture temporally adjacent to the current point on the timeline, wherein digital content records other than the focus record are and being displayed in a scroll-bar region of the display, wherein the scroll-bar region of the display is less prominent than the focus region on the display; and
   displaying digital content records of the second set of digital content records in the scroll-bar region on the display, having a time/date of capture and a span of capture equal to or including the current point on the timeline.

2. The method of claim 1, wherein the first digital content records displayed in the scroll-bar region do not overlap with the second digital content records in the scroll-bar region.

3. The method of claim 2, wherein the focus record is displayed in a main region of the display that does not overlap with the scroll-bar region of the display.

4. The method of claim 1, further comprising receiving a selection of the focus record, wherein the identifying step identifies the current point on the timeline based upon the time/date of capture of the focus record.

5. The method of claim 1, wherein a digital content record of the second set of digital content records is displayed in a manner overlapping only a portion of the focus record.

6. The method of claim 1, wherein the focus record is a still image and at a same point in the timeline there is a video from the second set of digital content records.

7. The method of claim 1, further comprising displaying on the display a user-selectable visual representation configured to cause, when selected, display of text or audio comments associated with the focus record and the current point on the timeline.

8. A method implemented at least in part by a data processing system, and the method comprising:
   instructing presentation of a first digital content record from a first source on an output device, wherein the first digital content record is a video or audio digital content record;
   identifying a second digital content record from a second source having an association with the first digital content record, wherein the association is based at least upon adjacency in time, a common object represented therein, a common event during which the first and second digital content records were captured, or a common location at which the digital content records were captured; and
   instructing presentation of the second digital content record on the output device while the first digital content record is being presented, wherein the presentation of the second digital content record is in a timeline format separate from a display region where the first digital content record is being presented, and wherein at least a portion of the first digital content record is instructed to be presented in a focus region of a display and the second digital content record is instructed to be presented in an scroll-bar region of the display, wherein the focus region of the display is more prominent than the scroll-bar region of the display.

9. The method of claim 8, wherein the first digital content record and the second digital content record are presented in a picture-in-picture manner.

10. The method of claim 8, further comprising receiving user-input pertaining to the second digital content record and, in response to the received user-input, instructing presentation of the second digital content record in the focus region of the display and the first digital content record in the scroll-bar region of the display.

11. The method of claim 8, wherein portions of the first digital content records are displayed in the scroll-bar region and do not overlap with the second digital content records in the scroll-bar region.

12. The method of claim 8, wherein presentation of the second digital content record includes displaying the second digital content record in a scroll-bar region of a display.

13. A system comprising:
   one or more processors configured to:
   receive a first set of digital content records from a first source;
   receive a second set of digital content records from a second source;
   organize the first set of digital content records and the second set of digital content records along a timeline, wherein each digital content record in the first set of digital content records and the second set of digital content records is associated with a point on or segment of the timeline based at least upon time/date of capture and span of capture, wherein digital content records in the first set of digital content records and the second set of digital content records are associated with at least a same point on the timeline;

identify a current point on the timeline;

display a digital content record of the first set of digital content records as a focus record, wherein the focus record is associated with the current point on the timeline and is displayed in a prominent section on a display;

display digital content records of the first set of digital content records other than the focus record on the display having time/dates of capture and spans of capture temporally adjacent to the current point on the timeline, wherein digital content records other than the focus record are displayed in a scroll-bar region of the display, wherein the scroll-bar region of the display is less prominent than the focus region on the display; and display digital content records of the second set of digital content records in the scroll-bar region on the display having a time/date of capture and a span of capture equal to or including the current point on the timeline.

14. The system of claim 13, wherein the first digital content records displayed in the scroll-bar region do not overlap with the second digital content records in the scroll-bar region.

15. The system of claim 14, wherein the focus record is displayed in a main region of the display that does not overlap with the scroll-bar region of the display.

16. The system of claim 14, wherein the one or more processors are further configured to receive a selection of the focus record and identify the current point on the timeline based upon the time/date of capture of the focus record.

17. The system of claim 14, wherein a digital content record of the second set of digital content records is displayed in a manner overlapping only a portion of the focus record.

18. The system of claim 14, wherein the focus record is a still image and at a same point in the timeline there is a video from the second set of digital content records.

19. The system of claim 14, wherein the one or more processors are further configured to display on the display a user-selectable visual representation configured to cause, when selected, display of text or audio comments associated with the focus record and the current point on the timeline.

* * * * *